No. 629,865.　　　　　　　　　　　　　　　Patented Aug. 1, 1899.
W. MARSHALL.
COMBINED HOG TRAP AND CRATE
(Application filed June 23, 1898.)
(No Model.)　　　　　　　　　　　　　　　　　　2 Sheets—Sheet 1.
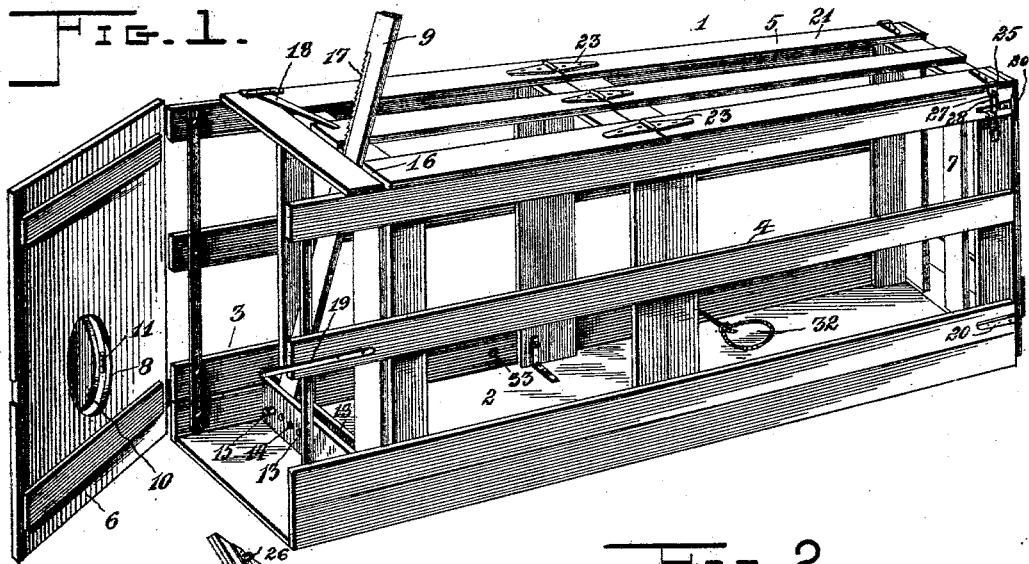
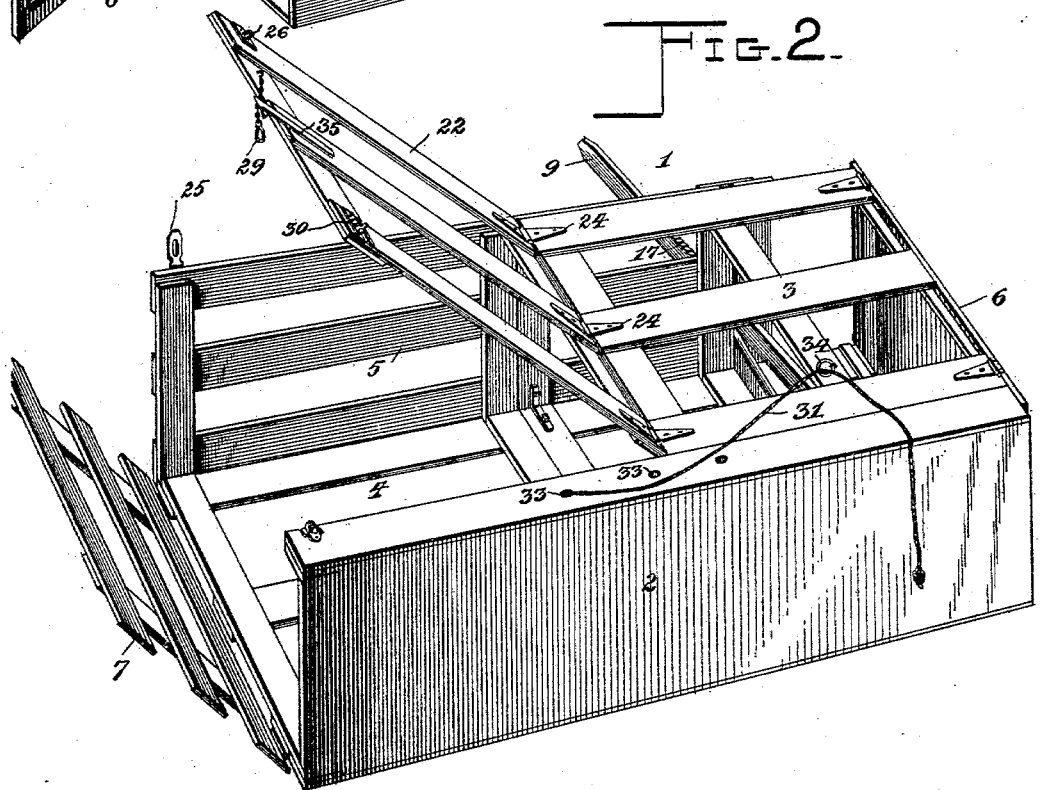
Witnesses　　　　　　　　William Marshall, Inventor
　　　　　　　　　　　　　By his Attorneys, No. 629,865. Patented Aug. 1, 1899.
W. MARSHALL.
COMBINED HOG TRAP AND CRATE.
(Application filed June 23, 1898.)
(No Model.) 2 Sheets—Sheet 2.
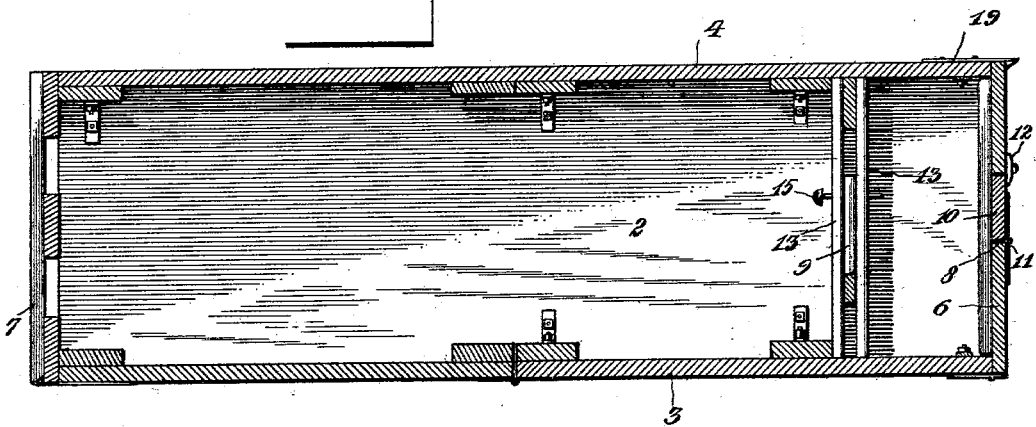
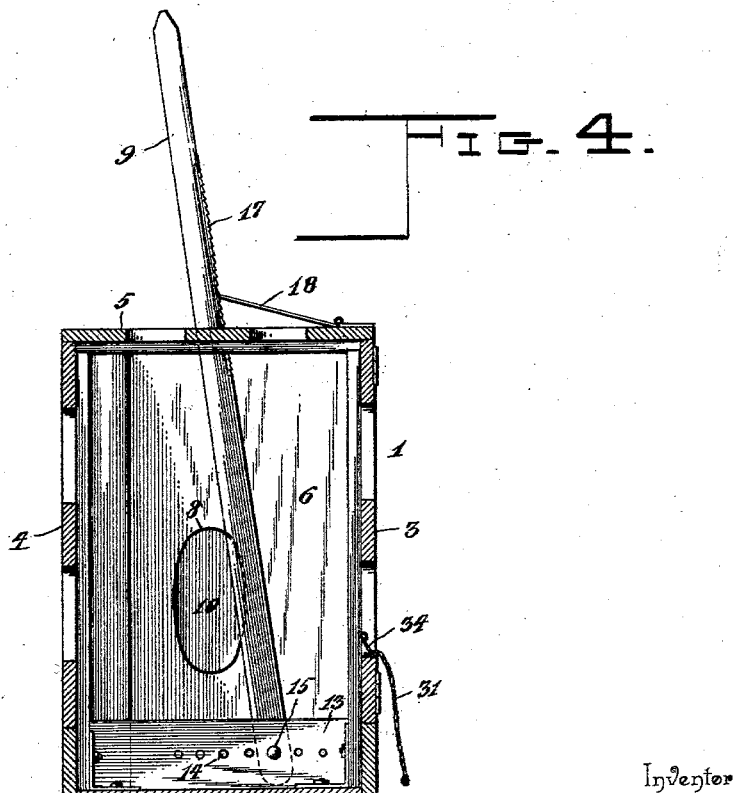
Witnesses
John F. Deufferwiel
H. F. Riley
Inventor
William Marshall,
By his Attorneys,
C. A. Snow & Co.

UNITED STATES PATENT OFFICE.

WILLIAM MARSHALL, OF RANKIN, ILLINOIS.

COMBINED HOG-TRAP AND CRATE.

SPECIFICATION forming part of Letters Patent No. 629,865, dated August 1, 1899.

Application filed June 23, 1898. Serial No. 684,290. (No model.)

*To all whom it may concern:*

Be it known that I, WILLIAM MARSHALL, a citizen of the United States, residing at Rankin, in the county of Vermilion and State of Illinois, have invented a new and useful Combined Hog-Trap and Crate, of which the following is a specification.

The invention relates to improvements in combined hog-traps and crates.

The object of the present invention is to improve the construction of hog-traps and to provide a simple and comparatively inexpensive one adapted to be readily converted into a shipping-crate and capable of securely holding a hog and of affording convenient access to it for ringing and other purposes.

The invention consists in the construction and novel combination and arrangement of parts hereinafter fully described, illustrated in the accompanying drawings, and pointed out in the claims hereto appended.

In the drawings, Figure 1 is a perspective view of a hog-trap constructed in accordance with this invention. Fig. 2 is a similar view, the rear portion of the hog-trap being open for exposing an animal to enable the latter to be conveniently operated on. Fig. 3 is a horizontal sectional view. Fig. 4 is a transverse sectional view.

Like numerals of reference designate corresponding parts in all the figures of the drawings.

1 designates a frame composed of a solid bottom 2, sides 3 and 4, a top 5, and end doors 6 and 7. The frame, which is rectangular in cross-section, is adapted to serve as a hog-trap and as a crate, and the sides and top are constructed of slatted work, as shown; but any other suitable construction may be provided. The front end door 6, which is preferably solid, as shown, is provided with an elliptical opening 8 to receive the snout of a hog, and the animal is securely held by a clamping-lever 9, mounted a short distance in rear of the door 6, as clearly shown in Fig. 1 of the accompanying drawings. The elliptical opening 8 of the door 6 is normally closed by a supplemental door 10, elliptical in shape and adapted to fit snugly in the elliptical opening 8. The supplemental door 10 is hinged at one side at 11, and it is secured when closed by a pivoted button 12 or other suitable fastening device.

When it is desired to ring a hog, the elliptical door is opened and the animal is driven forward in the frame until its snout projects through the elliptical opening. The animal is then secured by the clamping-lever, as hereinafter described, after which the end door 6 is opened to expose the animal more fully. After the ringing operation has been completed the hog may be released and allowed to escape through the front of the rack.

The clamping-lever 9 is fulcrumed at its lower end between a pair of transverse bars 13, arranged on the upper face of the bottom of the trap with their faces vertical and spaced apart to provide a way for the lever. The horizontal bars 13 are provided with perforations 14, arranged at intervals and adapted to receive a pivot-bolt 15, whereby the lever may be fulcrumed at the desired adjustment and arranged to clamp large and small animals. The upper portion of the clamping-lever extends through a transverse opening 16 of the top of the frame and is provided at one side with a series of downwardly-shouldered teeth 17, arranged to be engaged by a hinged pawl 18. The pawl, which may be of any desired form, can be conveniently constructed of a large strap-hinge, as shown.

The front end door is engaged at its free edge by a horizontal spring-catch 19, secured to the outer face of one of the horizontal bars of the side 4 of the frame. The rear door 7 is hinged at 20 to the side 4, and the top 5 of the frame is provided with a hinged section 21, and the side 3 has a hinged section 22. The sections 21 and 22, which are located at the back of the frame or trap, are hinged at their front or inner ends to the adjacent portions of the frame by hinges 23 and 24, located, respectively, at the top and sides of the trap. The top section is provided at opposite sides with hinged hasps 25, which engage staples 26 and 27 of the sides 3 and 4 and are secured in such engagement by snap-hooks 28 and 29, connected with the sides 3 and 4 by short chains; but any other suitable fastening device may be employed.

The hinged section 22, which is arranged at the side 3, is secured at its upper edge by the hasp 25 and the snap-hook 29 and a staple 27, and the lower edge of the section 22 is secured by a bolt 30, which engages a suitable keeper of the adjacent portion of the sides. The hinged sections 21 and 22 are employed when operating on hogs or sheep, and the animal operated on is secured by means of the clamping-lever 9 and by a rope 31. The rope 31, which is provided at its engaging end with a loop 32, is adapted to be passed through any one of a series of perforations 33, arranged at intervals near the lower edge of the side 3 of the frame. Different perforations are provided to accommodate the device to animals of different lengths, and the loop is engaged with the adjacent hind leg of an animal by making a slip-knot, and the leg is securely fastened to the side of the trap by drawing the rope through a ring 34 and tying it. After an animal is secured in this manner the trap is turned over on the side and arranged in the position shown in Fig. 2 of the accompanying drawings. The top section 21, the side section 22, and the rear end door 7 may be opened, so that convenient access may be had to the animal for operating on it. The door 7 is secured when closed by a catch 35, mounted on the section 22 and constructed like a catch.

The clamping-lever is capable of firmly holding the head of a hog when it is desired to remove the tusks and it can be readily detached to convert the trap into a shipping-crate.

The invention has the following advantages: The hog-trap, which is simple and comparatively inexpensive in construction, is adapted to be readily converted into a shipping-crate and is capable of securely holding the head of an animal for ringing it, or removing its tusks, or any other operation. The rear portion of the trap is also adapted to be readily opened after an animal is secured and it will be thoroughly exposed and readily accessible, so that it may be conveniently operated on.

Changes in the form, proportion, and minor details of construction may be resorted to without departing from the spirit or sacrificing any of the advantages of this invention.

What I claim is—

1. A hog-trap provided at one end with a door having a nose-opening combined with a clamping-lever located adjacent to the said door and adapted to engage an animal, the said door being adapted to be closed over the snout of an animal to hold the same, substantially as and for the purpose described.

2. A hog-trap comprising a body portion, a door 6 arranged at one end thereof and provided with an opening adapted to receive the snout of an animal, a supplemental door fitting in the opening of the door 6, and a clamping-lever mounted in the trap and located adjacent to the said door 6, whereby the latter is adapted to close over the snout of an animal, substantially as and for the purpose described.

In testimony that I claim the foregoing as my own I have hereto affixed my signature in the presence of two witnesses.

WM. MARSHALL.

Witnesses:
   E. H. WHITHAM,
   W. M. CUTLER.